Sept. 4, 1962  R. W. ROUNDS  3,052,359
PURIFICATOR
Filed Sept. 3, 1959  3 Sheets-Sheet 2

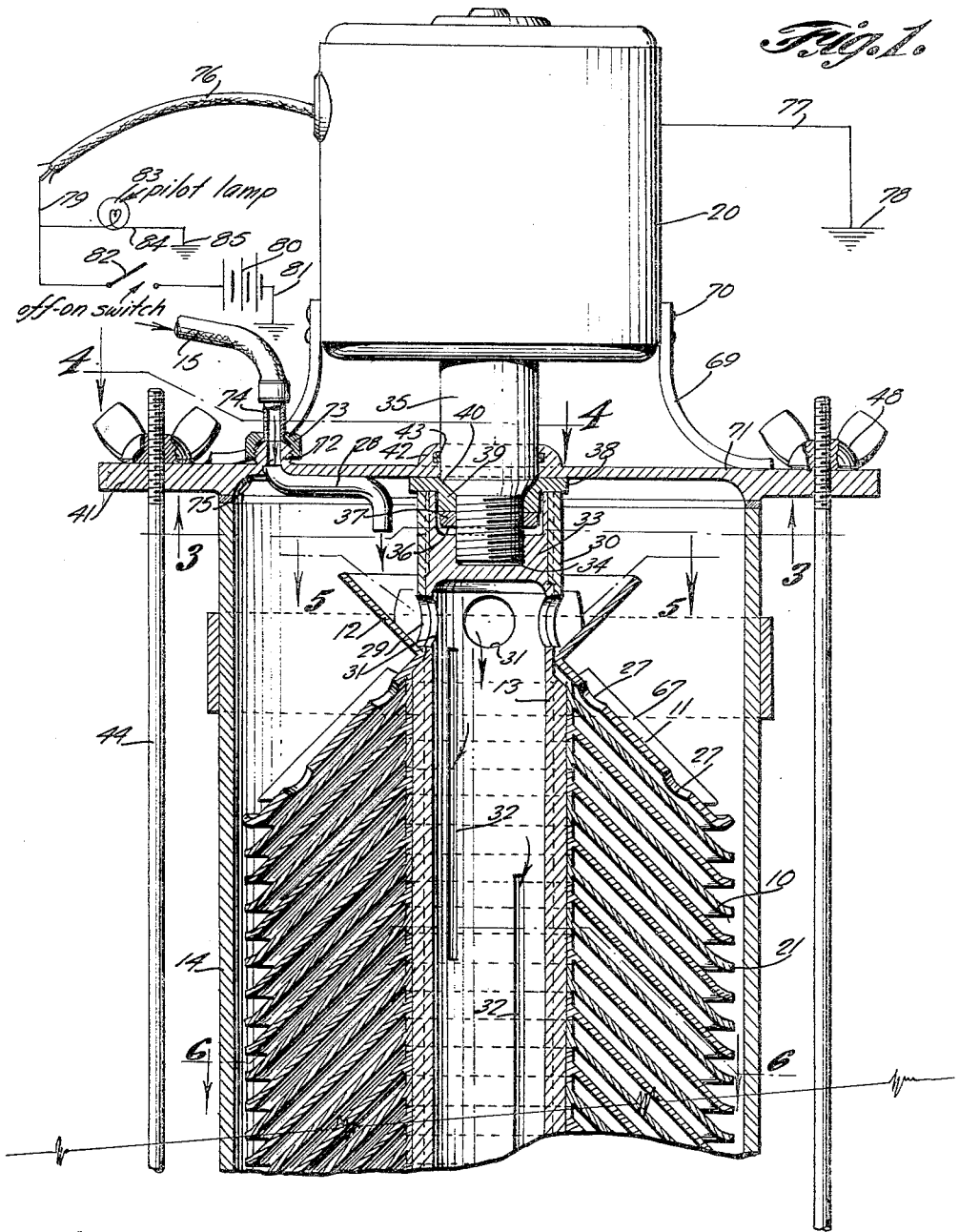

INVENTOR.
Ralph W. Rounds
BY Victor J. Evans & Co.
ATTORNEYS

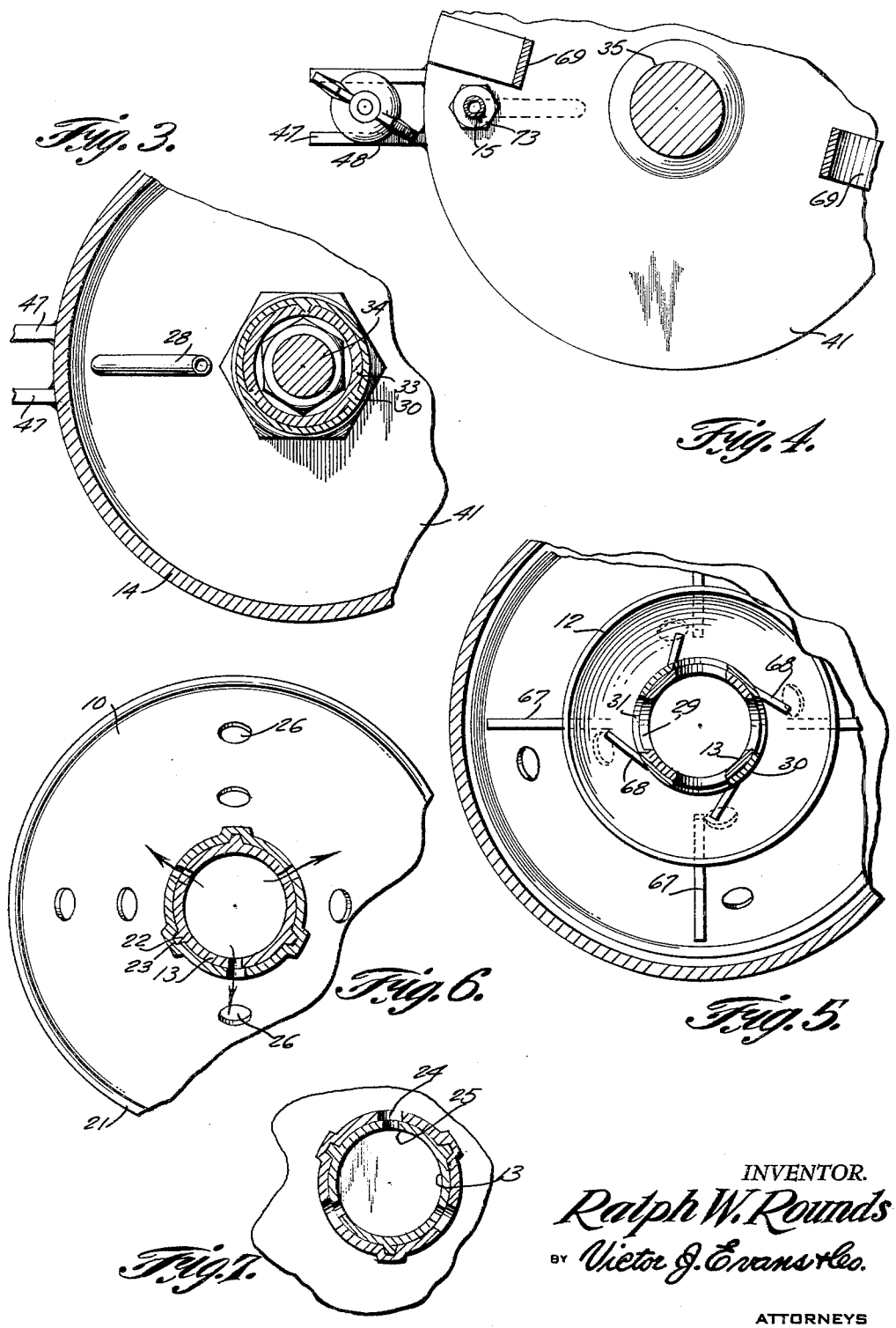

United States Patent Office 3,052,359
Patented Sept. 4, 1962

3,052,359
PURIFICATOR
Ralph W. Rounds, 820 N. 7th St., Rawlins, Wyo.
Filed Sept. 3, 1959, Ser. No. 837,921
2 Claims. (Cl. 210—299)

This invention relates to filters and purificators particularly for oil of motor vehicles, and in particular spaced cones positioned on and extended around a hollow tube with oil flowing over the cones, which may be stationary or rotating and with carbon and other foreign matter removed from the oil by the cones or discs and deposited into a sediment collecting chamber in the bottom of a housing in which the cones are positioned whereby the sediment or foreign matter may be drained off as desired.

The purpose of this invention is to provide means for continuously filtering or purifying oil of internal combustion engines with the engines operating whereby the necessity of changing oil at regular intervals is substantially obviated.

Substantially all internal combustion engines, particularly as used in motor vehicles, are provided with oil filters and whereas such filters remove foreign matter from oil the filtering elements are comparatively small and, consequently, such units are not efficient. With this thought in mind this invention contemplates a relatively small filter or purifier housing in which a relatively large number of filtering elements with comparatively large surface areas are provided, and in which the elements are readily cleaned whereby the highest possible efficiency is obtained.

The object of this invention is, therefore, to provide an oil filter and purifier for internal combustion engines of motor vehicles in which the oil is cleaned continuously as the engine operates.

Another object of the invention is to provide a purifier for oil of engines of motor vehicles in which the purifier may be installed on engines now in use.

Another important object of the invention is to provide an oil cleaner and purifier for engines of motor vehicles in which foreign matter may be removed from the housing of the cleaner and purifier without removing the device from the engine.

A further object of the invention is to provide an improved purifier for oil of internal combustion engines in which the purifier is of a simple and economical construction.

With these and other objects and advantages in view the invention embodies a tubular casing having a tube extended longitudinally through the center thereof with filtering elements mounted on the tube in the center and designed to be actuated by an electric motor and with supply and outlet connections and also a drain positioned in the casing.

Other features and advantages of the invention will appear from the following description taken in connection with the drawings, wherein:

FIGURE 1 is a vertical section through the upper part of the purifier, the lower portion being broken away, showing a motor connected to the upper end of a center tube on which filtering cones are positioned.

FIGURE 1-A is a similar section through the lower part of the purifier, being a continuation of FIGURE 1.

FIGURE 3 is a cross-section looking upwardly taken on line 3—3 of FIGURE 1 showing an oil tube extended from the oil pump of an engine, parts of the casing being broken away.

FIGURE 4 is a sectional plan taken on line 4—4 of FIGURE 1 also showing the oil supply connection.

FIGURE 5 is a sectional plan taken on line 5—5 of FIGURE 1 showing an oil distributing cone at the upper end of the filter, parts of the casing also being broken away.

FIGURE 6 is a sectional plan taken on line 6—6 of FIGURE 1 illustrating the mounting elements of the cones and showing openings through the cones, part of the cones also being broken away.

FIGURE 7 is a sectional plan taken on line 7—7 of FIGURE 1-A also showing the mounting elements of the cones and in addition, showing the openings through the center tube.

Figure 1A:
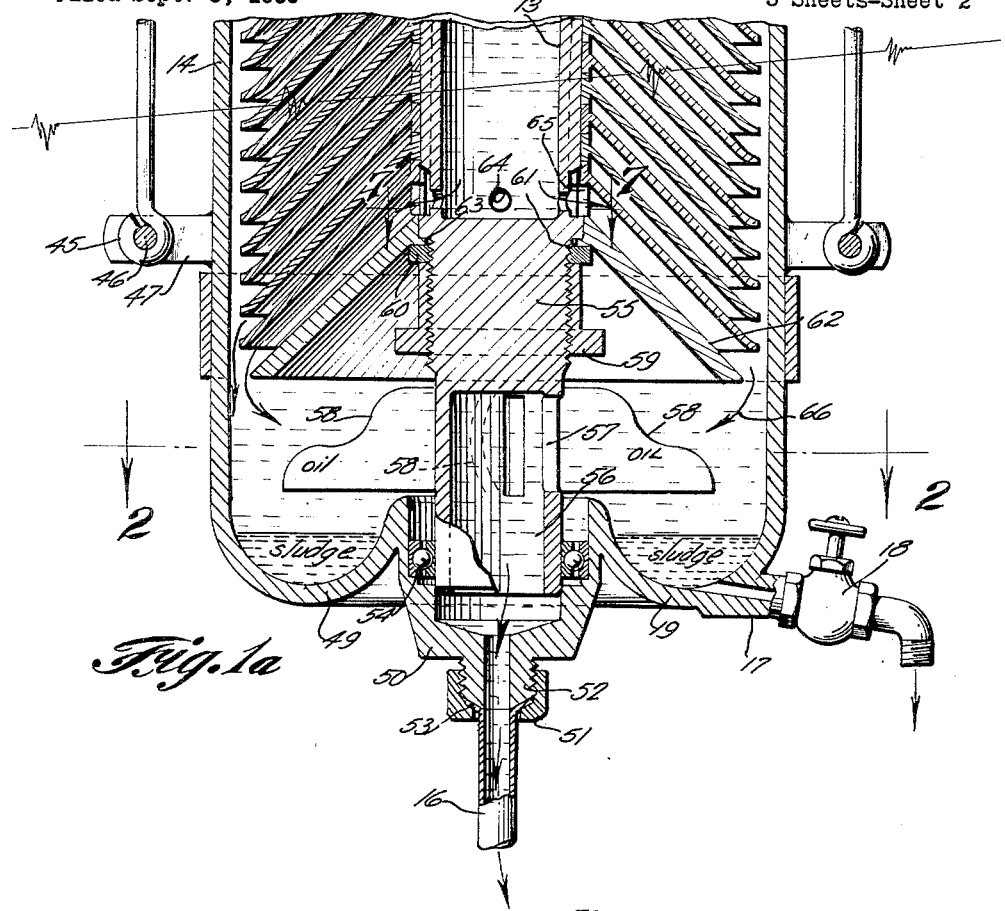

Referring now to the drawings wherein like reference characters denote corresponding parts the improved oil purifier of this invention includes a plurality of frustroconical-shaped elements 10 hereinafter referred to as cones, an upper distributing cone 11 having an inverted receiving cone 12 extended upwardly from the upper end, a center tube 13 on which the cones are mounted, a cylindrical casing 14 in which the center tube and cones are positioned, a supply tube 15 extended from the conventional oil pump of an engine, a return tube 16 extended from the lower end of the filter, a drain connection 17 having a valve 18 therein extended from a sediment receiving recess 19 in the lower end of the casing 14, and a motor 20 for rotating the center tube 13 and filtering or purifying cones.

As illustrated in FIGURE 1 the cones 10 which are provided with outwardly flared lower edges 21 are positioned over the center tube 13 with lugs 22 positioned in notches 23 in upper edges of the cones; and, as illustrated in FIGURE 7 openings 24 of the cones are positioned in registering relation with openings 25 in the wall of the center tube 13. The cones are also provided with openings 26 that permit the oil to seep through to cones below. The upper cone 11 is also provided with openings 27, similar to the openings 26 of the cones below and oil flows to the receiving cone 12 from the connection 15 and overflowing the upper edge of the cone 12 drops upon the cone 11 and passes through the openings 27 to cones below.

The receiving cone 12 receives oil from a section 28 of the tube 15 and deposits the oil in the cone 12 whereby the oil passes through openings 29 in a sleeve 30 and also through openings 31 in the center tube 13. From the center tube 13 oil passes through elongated slots 32 to the cones 10.

The upper end of the center tube 13 is provided with a head 33 into which the lower end of a stud 34 of a motor shaft 35 is threaded. The stud 34 is provided with a sealing washer 36, a spring ring 37 and a lock washer 38. The upper surface of the lock washer 38 is provided with a beveled seat 39 against which a similar beveled surface 40 of the motor shaft 35 is seated.

The casing 14 is provided with a head 41 and the head is provided with a packing ring 42 having a groove in which the sealing ring 43 is positioned.

The head 41 is secured to the lower part of the casing by rods 44 having eyes 45 on lower ends and the eyes are secured by pins 46 between ears 47 extended from sides of the casing. The upper ends of the rods are provided with thumb nuts 48.

The lower end of the casing 14 is provided with an arcuate surface 49 in which the annular recess 19 is positioned and the center portion of the lower end is provided with a hub 50 having a coupling nut 51 threaded on a nipple 52 extended from the hub 50 and securing a flared end 53 of the outlet tube 16 in sealing relation to the hub. The hub is also provided with a ball bearing 54 by which the lower end of the center tube is rotatably mounted in the lower end of the casing.

The center tube 13 is provided with a relatively solid section 55 below which is an open area 56 in the wall of which slots 57 are provided and oil circulating vanes 58 are positioned to follow the slots whereby oil is circulated from the lower end of the filter through the area 56 into the tube 16.

The section 55 at the lower end of the center tube is threaded and a lock nut 59, threaded thereon retains a sealing ring 60 and an inwardly extended flange 61 of a lower cone 62 against a shoulder 63 of the center tube whereby the cone 62, which is solid, is clamped in position on the end of the center tube.

The lower end of the center tube 13 is provided with openings 64 through which oil passes to openings 65 in the upper surface of the cone 62 from which the oil drains downwardly as indicated by the arrows 66 to the circulating vanes and through the openings 57 to the tube 16.

The upper surfaces of the discs or cones 10 are provided with ribs 67 that retain the cones in spaced relation and that provide panels to facilitate the flow of oil downwardly on outer surfaces of the cones. The inner receiving cone 12 is provided with baffles 68 that are positioned, as shown in FIGURE 5, whereby the baffles form scoops urging oil through the openings 29 and 31 of the center tube 13 and sleeve 30 so that the oil passes downwardly through the center tube.

The motor 20 is provided with outwardly extended legs 69 that are secured to the motor housing by screws or other fasteners and to the head 41 of the casing 14 by welding, as shown at the point 71 or by other means.

The head 41 of the casing 14 is provided with threaded boss 72 upon which a coupling 73 is threaded, the coupling securing the lower end of the section 74 of the intake over an opening 75 that extends through the boss 72 and head 41.

The motor 20 is provided with a conventional electric cord 76 and, for the purpose of illustration one wire 77 of the cord extends to a ground 78 and another wire 79 extends to one side of a battery 80, the opposite side of the battery being connected to a ground by a wire 81. The wire 79 is provided with a switch 82. The wire 79 is also provided with a pilot light 83 that is connected in a wire 84 which extends to a ground 85, the pilot light indicating that the motor is operating.

With the purifier mounted in the discharge connection of an oil pump of a motor vehicle, oil being discharged from the pump passes through the connection 15 and the section 28 thereof into the receiving cone 12 from which the oil passes through the openings 29 and 31 into the center tube 13 and from the center tube 13 the oil passes through the slots 32 to the cones or discs. From continued movement of the oil from one disc to another foreign matter in the oil is arrested and the foreign matter drops downwardly into the annular recess 19 from which the foreign matter may be drawn by opening the valve 18.

Figure 2:
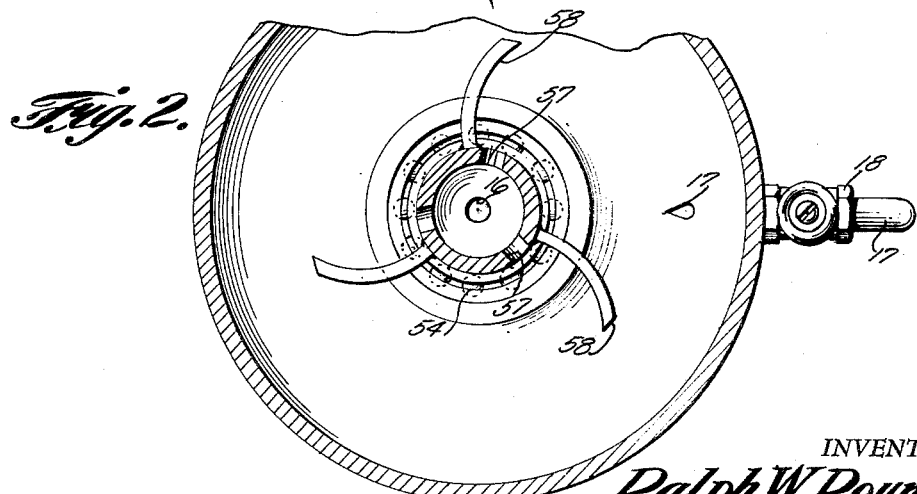
FIGURE 2 is a sectional plan through the lower part of a purifier casing taken on line 2—2 of FIGURE 1-A showing, in particular, circulating vanes for moving the oil.

Filtered oil passing from lower ends of the cones passes over the outer surface of the cone 62 and is scooped inwardly by the vanes 58, as shown in FIGURE 2 whereby the purified oil is gathered into the opening 56 in the lower part of the center tube from which the oil passes to the return connection 16 which carries oil back to the engine lubricating system.

The oil flows continuously, over the filtering baffles and at certain intervals the switch 82 may be closed to complete a circuit to the motor 20 so that the motor may rotate and spin the cones or filtering elements. Rotation of the filtering elements, however, is not required continuously and for this reason it is only necessary to rotate the motor short periods of time or once or twice a day, as may be desired.

It will be understood that modifications, within the scope of the appended claims, may be made in the design and arrangement of the parts without departing from the spirit of the invention.

What is claimed is:

1. In an oil purifier, the combination which comprises a vertically disposed cylindrical casing, a head on the upper end of the casing, a center tube having openings through the wall thereof depending from the head of the casing, filtering cones having openings therethrough mounted on the center tube and positioned in the casing, an upper distributing cone mounted on the center tube and positioned above the uppermost cone, an inverted frustro-conical-shaped receiving element also mounted on the center tube and positioned above the distributing cone in abutting relation with the upper end thereof, an oil supply connection positioned to discharge into the said inverted frustro-conical-shaped receiving element, said receiving element having openings therein, said center tube having openings therein that are positioned in registering relation with the openings in said receiving element and said cones, said cones and said receiving element having outwardly flared lower edges, said center tube having longitudinally extending lugs on the outer surface thereof, and said cones having notches in the upper edges thereof that receive the lugs on said center tube, whereby said center tube and said cones are mounted in fixed relation to each other, an outlet connection extended from the lower end of the casing, and a drain connection having a valve therein extended from an annular recess in the lower end of the casing.

2. In an oil purifier, the combination which comprises a vertically disposed cylindrical casing, a head on the upper end of the casing, a center tube having openings through the wall thereof depending from the head of the casing, filtering cones having openings therethrough mounted on the center tube and positioned in the casing, an upper distributing cone mounted on the center tube and positioned above the uppermost cone, an inverted frustro-conically shaped receiving element also mounted on the center tube and positioned above the distributing cone in abutting relation with the upper end thereof, an oil supply connection positioned to discharge into said inverted frustro-conical shaped receiving element, an outlet connection extended from the lower end of the casing, said receiving elements having openings therein, said center tube having openings therein that are positioned in registering relation with the openings in said receiving elements and in said cones, a lower distributing cone mounted on the center tube and positioned below the lowermost cone, circulating vanes positioned on said center tube below said lower distributing cone for rotation with the center tube to circulate oil through the openings in the center tube and the outlet connection, a drain connection having a valve therein extended from an annular recess in the lower end of the casing, and means for keying the cones in the center tube.

References Cited in the file of this patent

UNITED STATES PATENTS

| 1,301,544 | Crombie | Apr. 22, 1919 |
| 1,718,871 | Nordell | June 25, 1929 |
| 2,540,134 | Nelson | Feb. 6, 1951 |